United States Patent [19]

Haruo

[11] 4,397,744

[45] Aug. 9, 1983

[54] FILTER CLOTH SUSPENSION DEVICE FOR A FILTER PRESS

[75] Inventor: Hamazaki Haruo, Yao, Japan

[73] Assignee: Kurita Machinery Manufacturing Company, Limited, Osaka, Japan

[21] Appl. No.: 277,842

[22] Filed: Jun. 26, 1981

[30] Foreign Application Priority Data

Sep. 19, 1980 [JP] Japan ................... 55-131302

[51] Int. Cl.³ ............................. B01D 25/12
[52] U.S. Cl. ................... 210/225; 210/230; 210/236; 100/112; 100/198; 100/218
[58] Field of Search ............... 210/224–232, 210/236; 100/112, 113, 198, 218

[56] References Cited

U.S. PATENT DOCUMENTS 3,366,244 1/1968 Kurita .................... 210/225
3,669,273 6/1972 Kurita .................... 210/225

Primary Examiner—David R. Sadowski
Attorney, Agent, or Firm—Holman & Stern

[57] ABSTRACT

The upper ends of filter cloths attached to two adjacent filter plates are connected to a filter medium hanger suspended from suspension arms pivotally mounted on one of the filter plates in the upper regions on opposite sides thereof. Arm rests for supporting the suspension arms are provided on the other filter plate in the upper regions on opposite sides thereof. When the filter plates are moved from their closed state for filtration to their opened state upon completion of filtration, the suspension arms, tilting as supported by the arm rests, are caused to vibrate, thereby accelerating the stripping of the cake which has accumulated on the filter cloths connected to the filter medium hanger.

10 Claims, 9 Drawing Figures

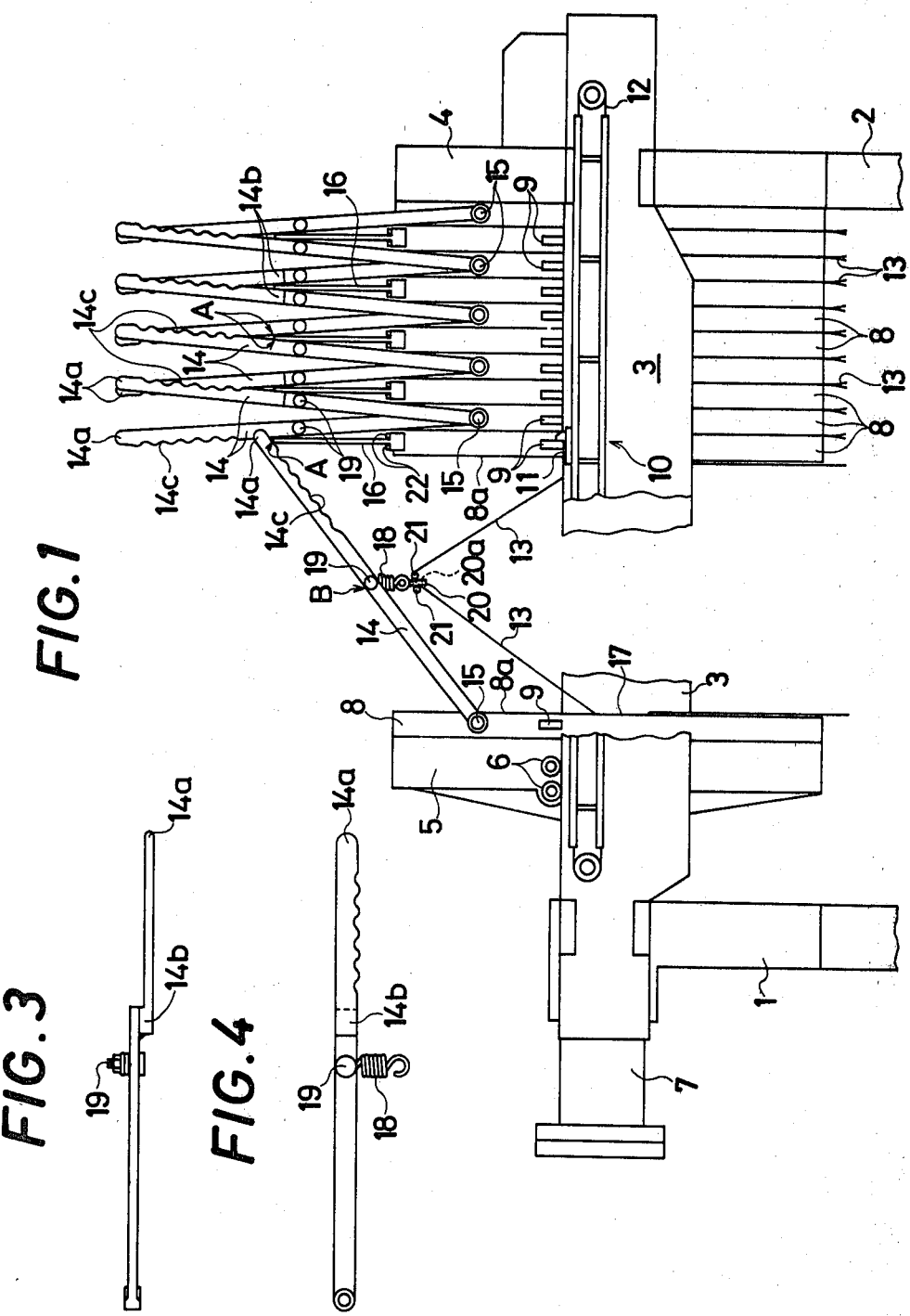

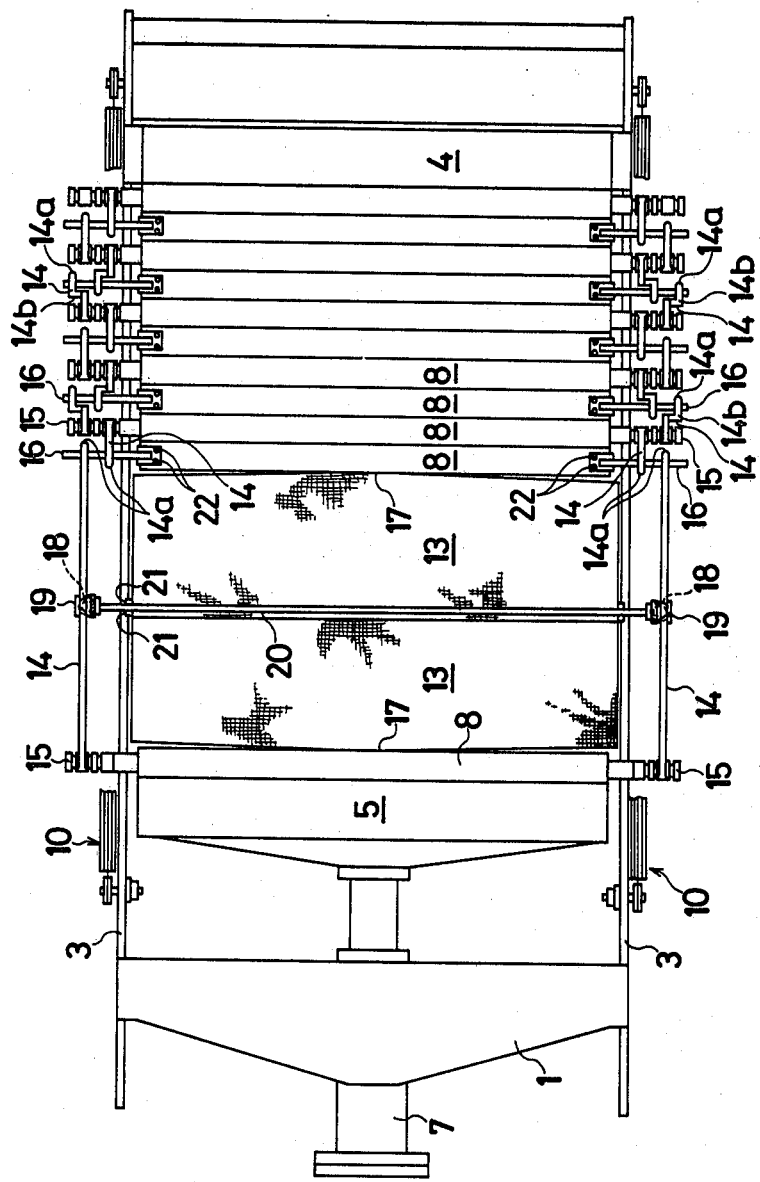

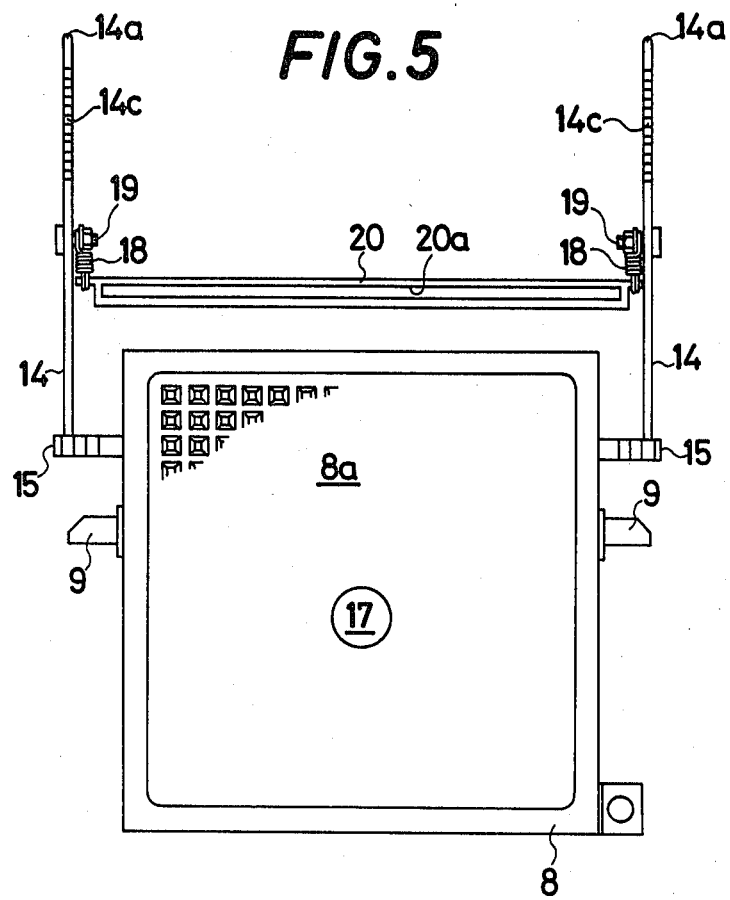
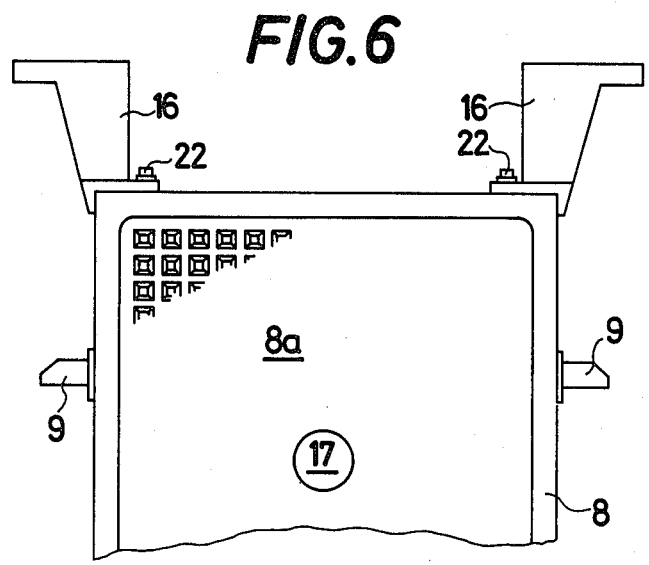

FILTER CLOTH SUSPENSION DEVICE FOR A FILTER PRESS

BACKGROUND OF THE INVENTION

1. Field of the Invention

This invention relates to a filter medium suspension device for filter presses and particularly to a filter medium suspension device for suspending a filter medium in an inverted V-shape between adjacent filter plates and stripping the cake from the filter medium upon completion of filtration.

2. Description of the Prior Art

This type of device, as disclosed in U.S. Pat. No. 3,366,244, comprises a pair of filter medium suspension arms whose lower ends are pivotally connected to adjacent filter plates on opposite sides thereof and whose upper ends are connected together so as to constitute filter medium suspension arms composed of linked arms connected in an inverted V-shape adapted to be opened and closed as the filter plates move away from and toward each other, and a hanger provided at the point of connection between the arms for suspending the upper end of said filter medium. As the filter medium suspension arms are opened and closed with the movement of the filter plates, the arm connecting point is moved upwards and downwards, thereby vibrating the filter medium to accelerate the stripping of cake when the plates are opened.

With such filter medium suspension system, however, many arms and their mechanical connections are required and their assembly, mounting and dismounting and exchange are not easy. Since the pair of arms for supporting the hanger suspending the filter medium are connected together, their mutual movement is limited are the opening of the filter medium caused by said suspension mechanism is not effective to impart sufficient vibration to the filter medium. As a result, there is a disadvantage that complete stripping of cake cannot be attained.

The present invention is intended to provide a filter medium suspension device capable of eliminating said drawback.

SUMMARY OF THE INVENTION

According to the invention, the upper free ends of filter medium suspension arms, whose lower ends are pivotally connected to one of two adjacent filter plates on opposite sides thereof, are in contact with arm rests of simple construction installed on the other filter plate in the upper regions on opposite sides thereof. Since the filter medium suspension arms pivotally connected to said one filter plate are subjected to a downward pulling force due to the tension in the filter medium, the opening of the filter plates upon completion of filtration causes said arms to move in contact with the arm rests on the other filter plate. As the filter plates move, the filter medium suspension arms tilt while changing their point of contact with the arm rests, whereby vibration is produced in said arms. This vibration is transmitted to the filter medium through the filter medium hanger, thereby accelerating the stripping of the cake.

According to the invention, since the filter medium suspension arms are pivotally mounted only on one of two adjacent filter plates on opposite sides thereof and since the upper ends of the filter cloths between these adjacent filter plates are suspended from this pair of filter medium suspension arms, as compared with the conventional inverted V-shaped linked arm type described above, the number of arms is reduced to half and assembly, mounting and dismounting and exchange of arms are correspondingly easier. Particularly, each filter medium suspension arm is pivotally mounted only at one end thereof and has no possibility of interfering with the movement of the other arms, so that free vibration can be produced in each arm. As the filter plates move away from and toward each other, the filter medium suspension arms tilt in contact with the arm rests while changing their points of contact with the latter, so that the arms effectively vibrate to impart sufficient vibration to the suspended filter medium to strip the cake from the latter.

BRIEF DESCRIPTION OF THE DRAWINGS

FIG. 1 is a side elevation view of a filter press illustrating an embodiment of the present invention, with the first filter plate shown opened;

FIG. 2 is a top plan view of the filter press of FIG. 1;

FIGS. 3 and 4 are a plan view and a front view, respectively, of a bent filter medium suspension arm;

FIG. 5 is a front elevation view of a filter plate having filter medium suspension arms;

FIG. 6 is a front elevation view of a filter plate having arm rests;

DESCRIPTION OF THE PREFERRED EMBODIMENTS

Figure 7:
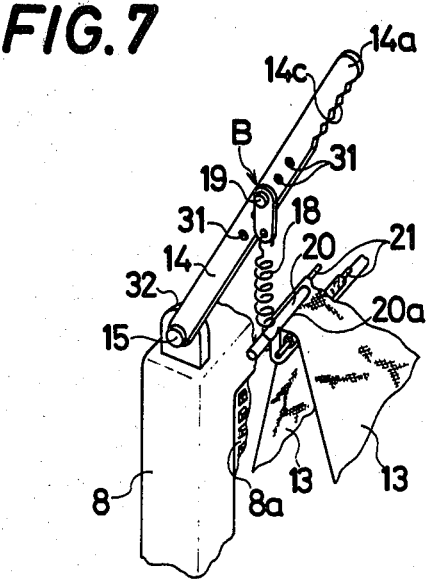
FIG. 7 is a fragmentary perspective view of another embodiment of the invention, showing a connecting construction for a filter medium suspension arm and a filter medium hanger.

Referring to FIGS. 1 through 6, showing an embodiment of the invention, the numerals 1 and 2 denote machine frames; 3 denotes a pair of side bars installed on and laterally between the machine frames 1 and 2; 4 denotes a fixed end plate; 5 denotes a movable end plate movably mounted on said side bars 3 by means of rollers 6 fitted to said movable end plate on opposite sides thereof; 7 denotes a cylinder for moving the end plate 5 backwards and forwards; and 8 denotes a number of filter plates disposed between the fixed and movable end plates 4 and 5 and, as is known in the art, movably mounted on the side bars 3 by means of handles 9 attached to said filter plates on opposite sides thereof. Filter plate moving means 10, known per se, comprises a filter plate moving element 11 and a drive belt 12 for reciprocating said moving element 11.

A pair of filter medium suspension arms 14 for suspending sheets of filter medium 13, such as filter cloths, are pivotally connected as at 15, each at one end thereof, to one of two adjacent filter plates 8 in the upper regions on opposite sides thereof. Arm rests 16 for supporting the free ends 14a of said filter medium suspension arms 14 are installed on the alternate filter plate 8 in the upper regions on opposite sides thereof. As said adjacent filter plates 8 are closed and opened, a load imposed on the filter medium suspension arms 14 by the filter cloths 13 causes said arms 14 to rise and fall changing their points of contact A with the arm rests 16.

FIGS. 1 and 2 illustrate the filter medium suspension arms 14 in their tilted state in relation to the arm rest mounted on the second filter plate when the first filter plate 8 has been opened toward the movable end plate 5.

In the group of filter plates on the right-hand side shown closed, every other filter plate 8 has pivotally connected thereto as at 15 by a common shaft a filter medium suspension arm 14 disposed between it and the front adjacent filter plate 8 and another filter medium suspension arm 14 disposed between it and the rear adjacent filter plate 8. Each of the other alternating filter plates 8 disposed between the filter plates 8, having filter medium suspension arms 14 pivotally connected thereto, has an arm rest 16 which is common to two filter medium suspension arms 14, one disposed between it and the front adjacent filter plate 8 and the other disposed between it and the rear adjacent filter plate 8. Some of the filter medium suspension arms 14 have a bend 14b to avoid interference between arms 14, but such bends 14b may be made unnecessary by suitable design.

Each filter cloth 13 is applied to the associated filter plate 8 to cover its filter face 8a and is fastened thereto around a central raw liquid feed hole 17 formed therein, as is known in the art. The upper ends of a pair of filter cloths 13, disposed between two adjacent filter plates 8, are suspended from positions B on the intermediate portions of a pair of filter medium suspension arms 14 disposed on one of the adjacent filter plates 8. More particularly, a coil spring 18 is suspended from said position B on the filter medium suspension arm 14 by means of a pin 19, and the upper ends of the filter cloths 13 are fastened to a filter medium hanger 20 having a horizontal slit 20a and held at its ends by the lower ends of the springs 18, whereby the filter cloths 13 are suspended. A filter medium locking pair 21 is inserted in a bag-like portion at the upper end of each filter cloth 13, with the opposite ends of said bar being exposed outside said bag-like portion. As shown in FIG. 7, the upper end of the filter cloth 13 is passed from one side to the other side of the slit 20a of the filter medium hanger 20 and the ends of the filter medium locking bar 21 are engaged with the edges of the hanger 20 on said other side of the slit 20a, whereby the upper end of the filter cloth 13 is connected to the filter medium hanger 20.

Each of said filter medium suspension arms 14 is shown as formed with a corrugated or notched surface 14c adjacent its free end 14a which slides in contact with the arm rest 16 with the movement of the filter plates, so that the arm is positively vibrated while moving along the arm rest. Such corrugated surface 14c, however, is not absolutely necessary. The arm rests 16, as shown in FIG. 6, are formed separately from the filter plate 8 and fastened to the latter on opposite shoulders thereof by bolts 22. They may, however, be integrally formed with the filter plate 8. Thus, their construction of attachment is optional.

Filtration is effected by actuating the cylinder 7 to move the movable end plate 5 to the right as viewed in FIGS. 1 and 2 to press the filter plates 8 between the movable and fixed end plates 5 and 4, thus establishing the so-called closed plate state. Raw liquid is then fed into individual filter chambers defined between the filter plates 8 through the raw liquid feed holes 17.

In the pressed state of the filter plates 8, as shown at right in FIGS. 1 and 2, the point of contact A at which the filter medium suspension arm 14 is supported by the arm rest 16 is positioned close to the filter medium suspension position B on the arm 14, with the arm 14 brought to an almost vertical position.

After the movable end plate 5 has been moved to the lefthand side position shown in FIGS. 1 and 2 by the cylinder 7, the filter plates 8 now folded at the fixed end plate 4 are transferred one by one to the movable end plate 5, starting with the filter plate 8 closest to the movable end plate 5, as shown in FIGS. 1 and 2, thereby opening the filter chambers defined between the filter plates 8. During this movement, the point of contact A at which the filter medium suspension arm 14 contacts the arm rest 16, as shown between the opened filter plates 8 at right in FIGS. 1 and 2, is moved from substantially the middle of the arm 14 to the free end 14a thereof, thereby tilting the arm 14, as shown.

During the sliding and tilting movement of the arm 14 in contact with the arm rest 16, the arm 14 is vibrated under tension from the filter cloths 13 and springs 18, the resulting vibration being transmitted to the filter cloths 13. Since the arm 14 is pivotally connected only at one end thereof, with the other end being free, said vibration is effected freely. In cases where a corrugated surface 14c is formed, wave motion is produced in a vertical plane. This vibration is transmitted to the filter cloths 13 through the springs 18 and filter medium hanger 20, so that it cooperates with vibration from the springs 18 to effectively and positively vibrate the filter cloths 13. Therefore, the filter medium suspension mechanism is, by itself, capable of imparting sufficient vibration to the filter cloths 13 to strip the cake therefrom.

The intermediary for suspending the filter cloths 13 from the filter medium suspension arms 14 is preferably an elastic material, such as a spring 18 or rubber string, for the purpose of positively vibrating the filter cloths 13. The use of a non-elastic string will not attenuate vibration. Even if the filter medium suspension bar is directly fixed to the filter medium suspension arms 14 to suspend the filter cloths, the latter can be caused to vibrate more than in the conventional arrangement. Therefore, the suspension system for suspending the filter cloths 13 from the arms 14 may be suitably selected according to the kinds of cake and filter medium.

In an embodiment shown in FIG. 7, the intermediate portion of the filter medium suspension arm 14 is formed with a plurality of attachment holes 31 so that the point at which the coil spring 18 is suspended by the pin 19, i.e., the filter medium suspension position B may be changed to change the filter medium suspension level so as to adjust the tension with which the filter cloths 13 are spread between the filter plates 8. In addition, in the embodiment shown in FIG. 7, the filter medium suspension arm 14 is pivotally connected, as at 15, to an attachment lug 32 projecting from the upper end of the filter plate 8.

Figure 8:
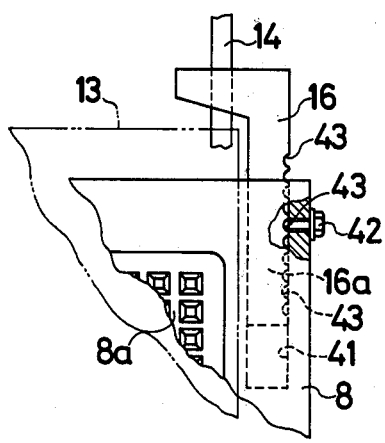
FIG. 8 is a front view of the principal portion of an arm rest according to another embodiment of the invention.

FIG. 8 shows an embodiment wherein the arm rest 16 is vertically adjustably mounted on the filter plate 8 to change the level of the arm rest. This is in consideration of the fact that the level of the arm rest indirectly influences the tension in the filter cloths 13. This arrangement may, of course, be employed in combination with the arrangement shown in FIG. 7 adapted to change the filter medium suspension position B on the filter medium suspension arm 14. The arm rest 16 is vertically adjustably inserted in one of holder holes or slots 41 formed in the upper end of the filter plate 8 on opposite sides thereof and is fixed at a desired level by a bolt 42. The leg portion 16a of the arm rest 16 inserted in the holder hole 41 is formed with engagement recesses 43 on its surface opposed to the bolt 42, thus ensuring that the arm rest 16 is fixed more positively by the bolt 42 engaging one of the engagement recesses 43.

Figure 9:
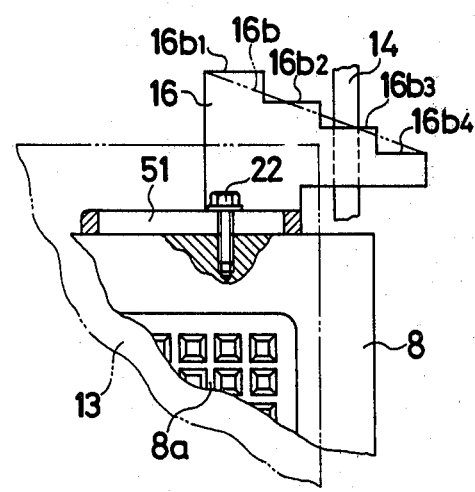
FIG. 9 is a front view of the principal portion of a further embodiment of the invention.

FIG. 9 shows another modification of arm rest 16 to be attached to the upper end of the filter plate 8 by a bolt 22, wherein a bolt receiving hole 51 in the arm rest 16 is in the form of an elongated hole extending parallel to the upper end surface of the filter plate 8, while the arm rest 16 is formed with arm support surfaces or shoulders 16$b_1$, 16$b_2$, 16$b_3$ . . . of different level or variable height like a series of steps lying above the filter plate 8. Thus, positional adjustment of the arm rest 16 in the direction of the length of the upper end surface of the filter plate 8 makes it possible to change the arm support surface supporting the filter medium suspension arm 14 so as to adjust the arm supporting level. In addition, an inclined arm support surface 16$b$ shown in phantom line would provide an embodiment which allows stepless adjustment of the arm supporting level.

The filter plates of the filter press shown in the embodiments are single filter plates of the center feed type having a raw liquid feed port at the center, but the invention is applicable also to the corner feed type and other types of filter plates and filter presses. The invention may be modified according to the spirit described in the claims without being limited to the embodiments described herein.

What is claimed is:

1. A filter medium suspension device for a filter press having a plurality of filter plates defining opposite abuttable faces and opposite sides, and including first and second adjacent filter plates, said filter medium suspension device comprising a pair of filter medium suspension arms each having a first free end and a second end pivotally mounted at said second end thereof on opposite sides of said first filter plates, said arms extending at an angle upwardly from said second end, a filter medium hanger means suspended from said arms suspending a filter medium by an upper end of the filter medium; said filter medium disposed between said first and second adjacent filter plates, and a pair of filter medium suspension arm rest means each installed on said second filter plate adjacent the opposite sides thereof for supporting by sliding contact said first free ends of said filter medium suspension arms and for providing that the attitude of said filter medium suspension arms is changed as said first and second filter plates are displaced with respect to each other.

2. A filter medium suspension device for filter presses as set forth in claim 1, wherein said filter medium hanger means comprises an elastic member.

3. A filter medium suspension device for filter presses as set forth in claim 2, wherein said elastic member comprises a spring.

4. A filter medium suspension device for filter presses as set forth in claim 2, wherein said elastic member comprises a rubber string.

5. A filter medium suspension device for filter presses as set forth in claim 1, wherein each filter medium suspension arm has a corrugated surface in sliding contact with said arm rest means.

6. A filter medium suspension device for filter presses as set forth in claim 1 or claim 5, wherein said arm rest means is adjustably mounted on said second filter plate so that its arm supporting level can be changed with respect to said filter medium suspension arm.

7. A filter medium suspension device for filter presses as set forth in claim 6, wherein said arm rest means is vertically movably installed on said second filter plate.

8. A filter medium suspension device for filter presses as set forth in claim 6, wherein each of said arm rest means has an arm support surface of varying height extending in the direction of the length of the upper end of said second filter plate to allow adjustment of the position of said arm rest means in said direction.

9. A filter medium suspension device for filter presses as set forth in claim 8, wherein said varying height arm support surface comprises a stepped surface.

10. A filter medium suspension device for filter presses as set forth in claim 8, wherein said varying height arm support surface comprises an incline surface.

* * * * *